US007877760B2

(12) United States Patent
Oney et al.

(10) Patent No.: US 7,877,760 B2
(45) Date of Patent: Jan. 25, 2011

(54) DISTRIBUTED HARDWARE STATE MANAGEMENT IN VIRTUAL MACHINES

(75) Inventors: Adrian J. Oney, Woodinville, WA (US); Andrew John Thornton, Seattle, WA (US); Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1123 days.

(21) Appl. No.: 11/540,211

(22) Filed: Sep. 29, 2006

(65) Prior Publication Data

US 2008/0082975 A1    Apr. 3, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/321; 719/313
(58) Field of Classification Search ......... 719/321–327; 718/1, 2

See application file for complete search history.

(56) References Cited

U.S. PATENT DOCUMENTS

| 6,854,115 | B1 | 2/2005 | Traversat et al. ............ 718/1 |
| 6,865,657 | B1 | 3/2005 | Traversat et al. ............ 711/170 |
| 6,941,410 | B1 | 9/2005 | Traversat et al. ............ 711/6 |
| 2006/0206904 | A1* | 9/2006 | Watkins et al. ............ 719/321 |
| 2006/0253619 | A1* | 11/2006 | Torudbakken et al. ......... 710/31 |
| 2007/0061441 | A1* | 3/2007 | Landis et al. ............ 709/224 |
| 2007/0067435 | A1* | 3/2007 | Landis et al. ............ 709/224 |

* cited by examiner

*Primary Examiner*—Diem K Cao
(74) *Attorney, Agent, or Firm*—Woodcock Washburn LLP (57) ABSTRACT

Mechanisms are disclosed herein that manage operations in virtual machine environments. A first partition can have a proxy driver object corresponding to a driver object in a second partition. The driver object can control a physical device, but because of the proxy driver object, the first partition can retain some measure of control over the physical device. The driver object can be surrounded by a first filter object beneath it, and a second filter object above it. The first filter object can provide interfaces to the driver object so that the driver object can perform various bus-related functionalities; and, the second filter object can receive redirected instructions from the first partition and provide them to the driver object, and intercept any instructions originating from within the second partition, such that if these instructions are inconsistent with policies set in the first partition, they can be manipulated.

20 Claims, 8 Drawing Sheets

DISTRIBUTED HARDWARE STATE MANAGEMENT IN VIRTUAL MACHINES

FIELD OF TECHNOLOGY

The presently disclosed subject matter relates to the field of computing, and more particularly, to computer virtualization, although virtualization is merely an exemplary and non-limiting field.

BACKGROUND

For the most part, input/output (I/O) devices are not meant to be shared by multiple operating systems. They are designed to be controlled by one integrated software module that manages all of the functional aspects of such devices. It is even difficult in a given operating system that controls an entire physical machine to ensure that a single software module controls a device. In virtual machine environments that have multiple operating systems running simultaneously, it's much more difficult.

Designers of virtual machine environments are always faced with a trade-off. Individual operating systems can directly control individual devices, or, they can rely on either the virtual machine layer or on other operating systems running on the same machine for I/O services. In the former case, complex management of the entire machine is involved, and in the latter case slowness is a concern. Thus, one problem the presently disclosed subject matter solves is the "device assignment" problem—in other words, how to assign devices to modules such that assignment is not complex and yet processing is fast.

Furthermore, virtual machines (or partitions) that own physical hardware devices can be further broken down based on their trust relationships. In some virtual machine environments, a partition can own a device but not trust any other partition in the machine. In others, a partition may trust another partition, especially one that manages policy for the entire machine. Thus, another problem the presently disclosed subject matter solves is assignment of devices to non-privileged partitions, where there is at least one trusted partition (or component within the virtual machine layer itself) that manages policy for the entire machine.

SUMMARY

The presently disclosed subject matter solves the aforementioned problems associated with device assignment, especially in the context of virtual machine environments with trusted and non-privileged partitions. In one exemplary and non-limiting aspect, a first partition, which can be a trusted primary partition, can have a proxy driver object corresponding to a device driver object in a second partition, which can be a non-trusted secondary partition. The device driver object in the secondary partition can control a physical device, but because this setup has the proxy driver object located in the primary partition, the primary partition can retain some measure of control over the physical device. Thus, in one aspect of the presently disclosed subject matter, control over device state can be separated. The primary partition can have control over system-wide device state, such as the turning on or off of a device, while the secondary partition can retain local control over more local device state, such as I/O functionality.

In another aspect, the driver object, residing on a stack, can be surrounded by a first filter object beneath it, and a second filter object above it. The first filter object can provide interfaces to the driver object so that the driver object can perform various bus-related functionalities. And, moreover, the second filter object can perform at least two tasks: (1) receive redirected instructions (by the proxy driver object) from the primary partition and provide them to the driver object in the secondary partition, and (2) intercept any instructions originating from modules within the secondary partition, such that if these instructions are inconsistent with policies set in the primary partition, they can be substituted, altered, or ignored.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

The presently disclosed subject matter while solving the problems mentioned above in the Background section, enables at least the following: (a) a trusted partition (which is often the parent partition) to be able to accomplish machine-wide tasks, such as device hot-plug, system sleep or shutdown, and so on; (b) machine-wide tasks that can be accomplished in either a partition or the virtual machine manager layer itself; (c) control of one or more physical devices by an untrusted partition, where such control does not cause other software running on the machine to crash; and (d) prevention of holding an entire machine hostage, preventing sleep, shutdown or insertion of new devices.

Furthermore, the presently disclosed subject matter provides for intercepting messages within a parent partition associated with a physical device and redirecting such messages to a child partition. Within the child partition, when a device driver is loaded for the physical device, this driver can be wrapped by another driver which intercepts messages coming from the child partition's Plug-and-Play manager or other manager, replacing them with ones that correspond to policy decisions made in the parent partition. Of course, this is merely an exemplary and non-limiting overview, and various other aspects related thereto are disclosed herein.

Virtual Machines in General Terms

Figure 1:
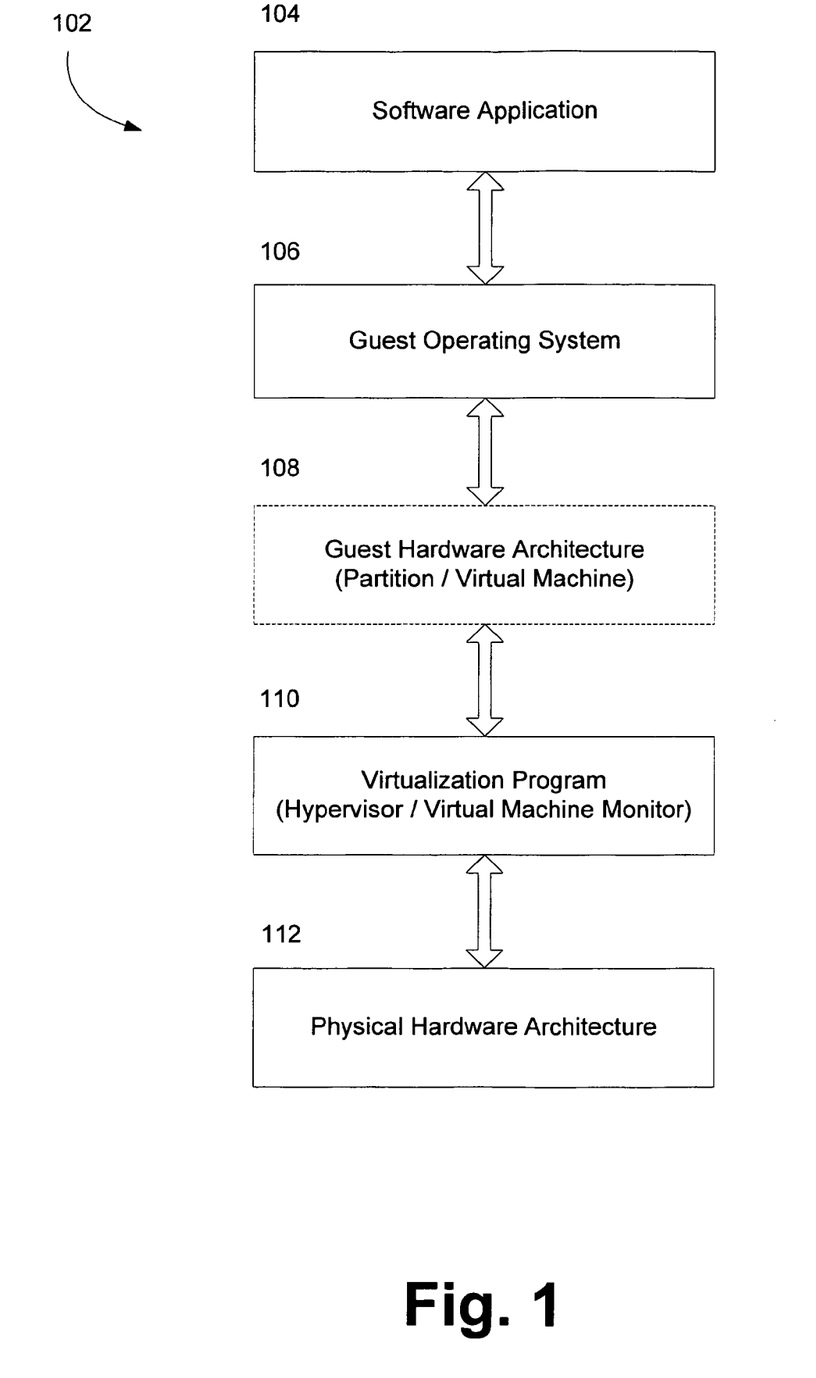
FIG. 1 is a block diagram representing the logical layering of the hardware and software architecture for virtualized operating environment in a computer system.

FIG. 1 is a diagram representing the logical layering of the hardware and software architecture for a virtualized environment in a computer system. In FIG. 1, a virtualization program 110 runs directly or indirectly on the physical hardware architecture 112. The virtualization program 110 may be (a) a virtual machine monitor that runs alongside a host operating system or (b) a host operating system with a hypervisor component, where the hypervisor component performs the virtualization. The virtualization program 110 virtualizes a guest hardware architecture 108 (shown as dashed lines to illustrate the fact that this component is a partition or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2:
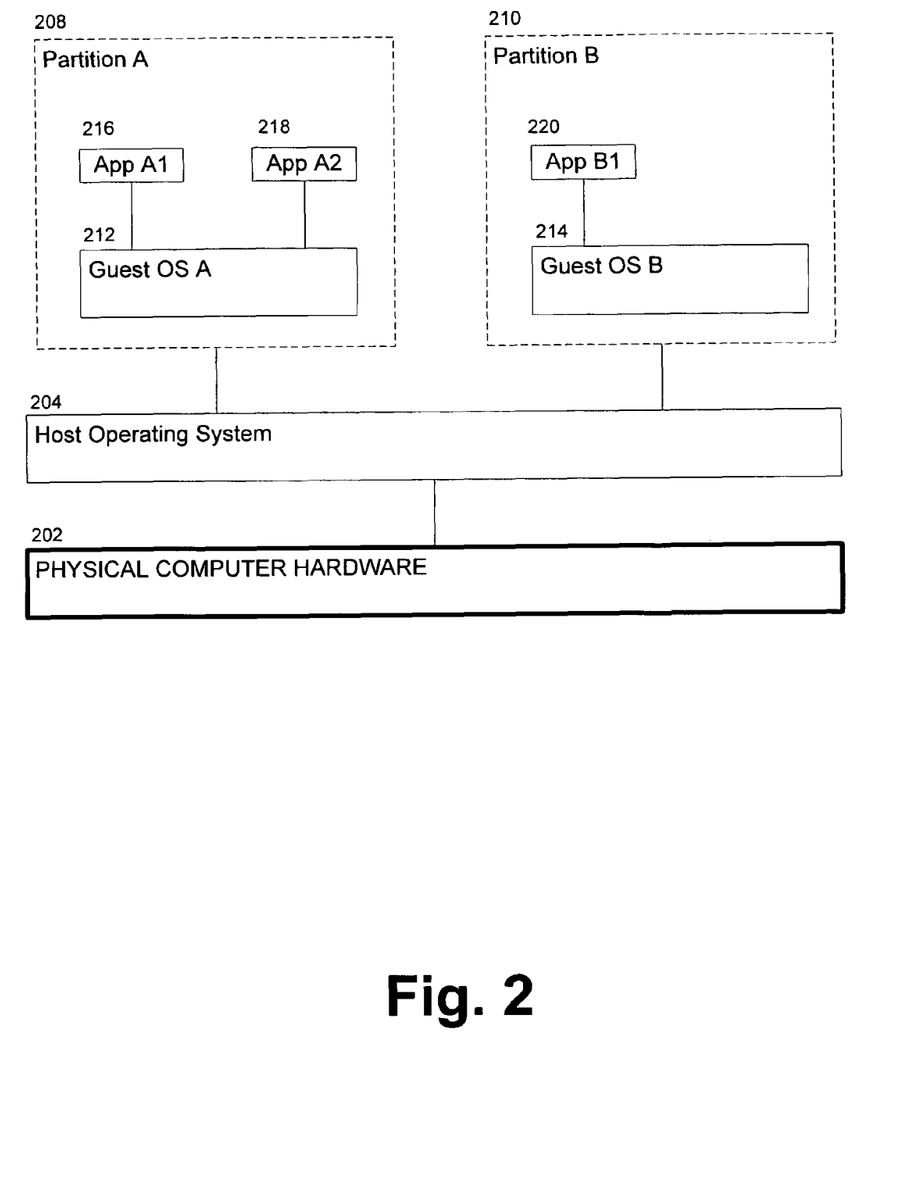
FIG. 2 is a block diagram representing a virtualized computing system, where virtualization is performed by the host operating system (either directly or via a hypervisor)

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that exist only as software constructs. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 3:
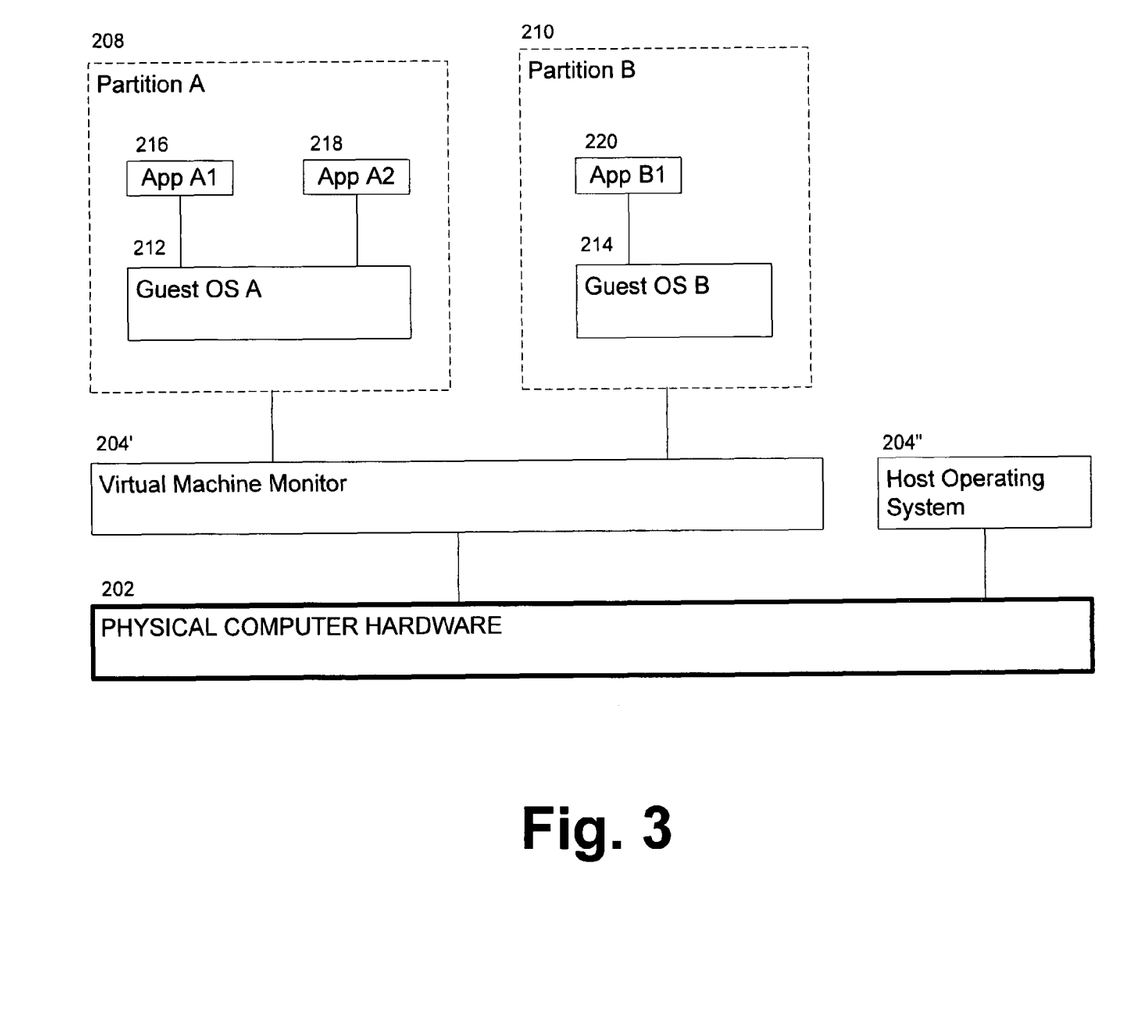
FIG. 3 is a block diagram representing an alternative virtualized computing system, where virtualization is performed by a virtual machine monitor running alongside a host operating system.

FIG. 3 illustrates an alternative virtualized computing system where the virtualization is performed by a virtual machine monitor (VMM) 204' running alongside the host operating system 204". In certain cases, the VMM 204' may be an application running above the host operating system 204" and interacting with the computer hardware 202 only through the host operating system 204". In other cases, as shown in FIG. 3, the VMM 204' may instead comprise a partially independent software system that on some levels interacts indirectly with the computer hardware 202 via the host operating system 204", but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204" (although still interacting with the host operating system 204" in order to coordinate use of the computer hardware 202 and avoid conflicts and the like).

All of these variations for implementing the above mentioned partitions are just exemplary implementations, and nothing herein should be interpreted as limiting the disclosure to any particular virtualization aspect.

Aspects of Managing Device and System State in Virtual Machines

The aforementioned partitions in FIGS. 2 and 3 can be implemented in the form of primary partitions and secondary partitions; or, in one non-limiting aspect, as trusted partitions and non-trusted (non-privileged) partitions, respectively; or, in yet another non-limiting aspect, as parent partitions and child partitions, respectively. Whatever relationship is established between such partitions, one goal of the present disclosure is to allow for the assignment of devices (whether physical or virtual) from such primary partitions to secondary partitions, so that the secondary partitions can exercise control over the devices, yet, allowing the primary partitions to have input as to how such devices can and will behave.

Primary partitions can have proxy driver objects that stand-in as proxies for device driver objects in secondary partitions. Such device driver objects, typically residing on driver stacks, can be surrounded on top and bottom by filters to ensure that such device driver objects are properly behaving according to polices implemented by the primary partitions. Such policies and other instructions (whether including code and/or data) can be communicated by the proxy driver objects to any object on the driver stack in the secondary partition.

Figure 4:
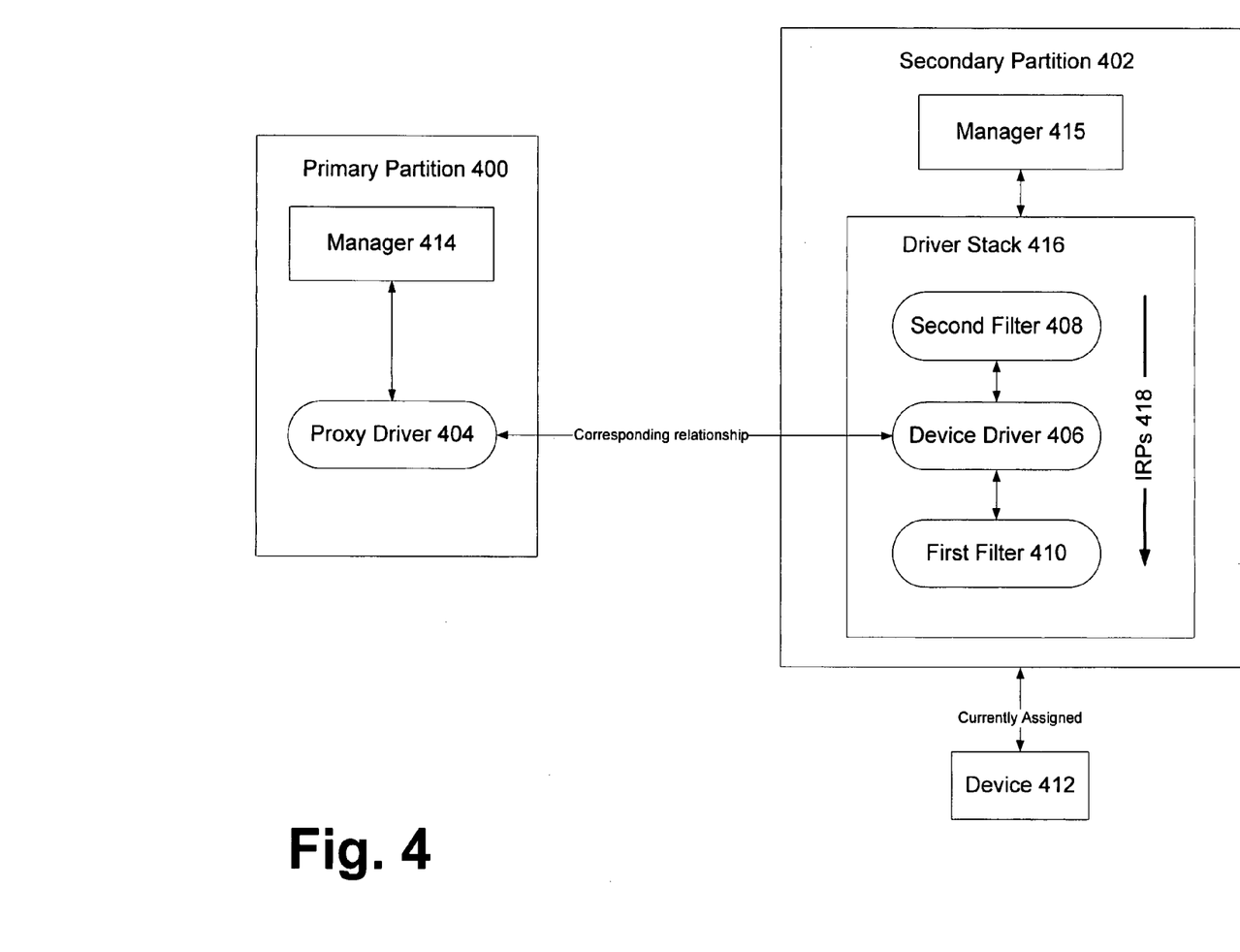
FIG. 4 illustrates an exemplary and non-limiting system for managing operations in a virtual machine environment.

For example, in one non-limiting aspect of the present disclosure, FIG. 4 illustrates a system for managing operations in a virtual machine environment thereby allowing for distributed hardware state management. In other words, it illustrates how, for example, the proxy driver object 404 in the primary partition 400 can communicate with objects 408, 406, 410 on the driver stack 416, such that even though the device driver object 406 maintains control of a device 412, the proxy driver object 404 still has input regarding how such a device 412 will be controlled because of the way in which the filters 408, 410 present instructions to the device driver object 406.

For example, the second filter 408 can forward instructions from the proxy driver object 404 to the device driver object 406, thereby having a say as to how the device driver 406 will behave (and hence how the device 412 that the device driver object 406 is controlling will behave). Or, alternatively, the second filter 408 can intercept instructions issued from anywhere in the second partition 402 and either pass them along to the device driver object 406 or substitute such instructions with other instructions—which may conform to some policies set by the primary partition 400 (where such instructions, for example, can be provided by the proxy driver object 404).

Thus, per FIG. 4, in one aspect of the presently disclosed subject matter, a proxy driver object 404 located in a primary partition 400 can be used, where the proxy driver object 404 is a proxy driver for the device 412. In other words, it is not, strictly speaking, the driver object for the device 412, but because it can communicate with any of the filters 408, 410 on the driver stack 416, and these filters 408, 410 can pass (or not pass) instructions that the actual device driver object 406 will see, it is a device driver for the device 412, albeit by proxy.

Furthermore, FIG. 4 shows a device driver object 406 that is located in a driver stack 416 in the secondary partition 402, where the device driver object 406 is configured to control the device 412. It can be seen that there is a first filter object 410 located beneath the device driver object 406 in the driver stack 416. The first filter object 406 has many functionalities, one of which may be presenting an interface to the device driver object 406 so that the device driver object 406 can engage in bus-related functions including controlling the device 412. Such bus-related functions, of course, are not only limited to controlling the device 412, but may include obtaining information that the device driver object 406 requests, such as, for example, the first filter 410 can inquire the proxy driver 404 about address space information for the device 412.

Additionally, a second filter object 408 located above the device driver object 406 in the driver stack 416, can be configured to (a) direct a first set of instructions from the proxy driver object 404 to the device driver object 406 and/or (b) intercept a second set of instructions intended for the device driver object 406, where the second instructions can originate from the secondary partition 402. This means that the second filter 408 can have a dual functionality: serve as a mechanism that relays instructions from the proxy driver 404 to the device driver 406, and as a mechanism that intercepts instructions issued for the device driver 406—where these latter instructions will typically be issued by the secondary partition 402, although they could just as easily be issued by another partition, such as a tertiary non-trusted partition.

In this latter case, upon intercepting of the second instructions, the second filter object 408 can compare the second instructions against policies set by the primary partition 400 and/or a virtualizing module, such as a hypervisor, a virtual machine monitor, and so on (shown in FIGS. 2 and 3). If the second instructions conflict with these policies, the second filter object 408 can replace theses second instructions with instructions that are consistent with the policies. Then, the second filter object 408 can pass these consistent instructions down to the device driver object 406.

In one aspect of the presently disclosed subject matter, per FIG. 4, the primary partition 400 can have an object 414 (such as a plug-and-play manager object and/or a power manager object, or any other object capable of issuing instructions) communicating with the proxy device object 404, where the primary partition 400 object 414 directs the proxy device object 404 to implement state-changing events. Such state-changing events can be conveyed via the first instructions. It goes without saying, that the first instructions can be used to issue either system-wide events, such as system shutdown, or system standby for the entire physical machine and each partition, or, alternatively, more local events such as commanding the device driver object 406 to shut down the device 412.

In another aspect, the system of FIG. 4 can have a secondary partition object 415 (again, such as a plug-and-play manager object and/or a power manager object, or any other object capable of issuing instructions) communicating with the second filter object 406 via the aforementioned second instructions. The secondary partition object 415 can direct the second filter object 408 to implement instructions related to a plug-and-play event (plugging-in of a mass storage device, a digital camera, etc.) and/or a power event (shutdown, hibernate, etc.).

In either the intercepting case or the directing case, if the device driver object 406 refuses to conform to at least one policy set by the primary partition 400 (namely a module therein, such as the manager 414), control of the device 412 by the device driver object 406 can be revoked. The revocation may depend on various variables, such as a set of strict rules or generally observed guidelines, or anything similar thereto. Those of skill in the art will readily appreciate the multitude of various policy vetting regimes that can be implemented with the presently disclosed aspect.

These are merely exemplary aspects. It is understood that, for example, each one-way communication relationship can entail its complement. In other words, since the proxy driver 404 can communicate with objects 408, 406, 410 on the device stack, it is understood that the opposite communication is also contemplated herein. For instance, the proxy driver 404 can also receive communications from secondary partition 402 objects, such as requests for access to configuration space and other resources that cannot be mapped into memory or I/O space of the secondary partition 402.

Exemplary Implementations of Managing Operations in Virtual Machines

Figure 5:
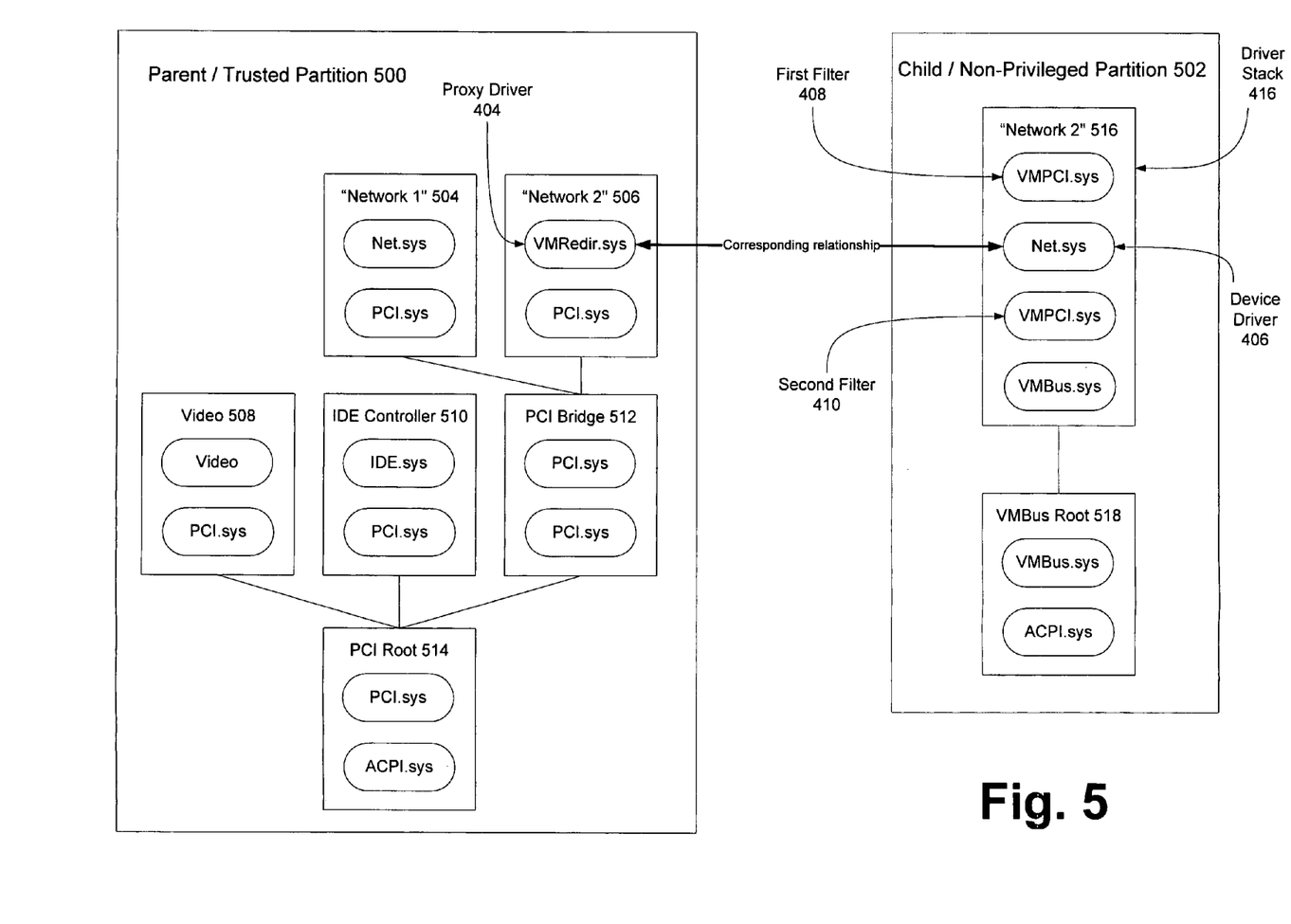
FIG. 5 illustrates an exemplary and non-limiting implementation of the system discussed with reference to FIG. 4.

Various operating systems are contemplated herein for use within the virtual machines and partitions shown in FIGS. 2, 3, and 4 so far. Windows, for example, typically performs I/O by building stacks of device driver objects that each play a role in the management and control of devices. Each individual I/O request packet (IRP) 418 can be sent to the top driver object (e.g. second filter object 408) within a stack (e.g. driver stack 406), which passes the IRP down the stack when it's finished with it. Each driver object, in turn, receives the IRP and performs the appropriate processing to that layer in the stack. The bottom most layers are generally concerned with setup and configuration. In FIG. 5, for example, this bottom layer would correspond to objects "PCI.sys", "VMBus.sys", and "ACPI.sys" (these acronyms refer to a "peripheral component interconnect" (PCI) object, a "virtual machine bus" (VMBus) object, and an "advanced configuration and power interface" (ACPI) object). Those of skill in the art will readily recognized these and any other acronyms used herein.

In Windows, physical devices (e.g. device 412) are discovered by bus drivers (e.g. "PCI.sys") which own the management of an entire bus within a physical computer system. A device might be plugged into a "PCI Express" bus within the system and it can be discovered by a "PCI Express" bus driver within Windows. It is this driver ("PCI.sys") that can engage in a protocol with a manager, such as a Plug-and-Play (PnP) manager, that will cause another driver (called a Functional Driver, or FDO) to get loaded. This FDO (e.g. device driver 406) actually controls the device. "PCI.sys" also can expose interfaces that are specific to the configuration of a PCI Express device, allowing the FDO to manipulate the device during setup and configuration.

When a bus driver discovers a new device, it can create a new device object, creating the bottom of a new device stack. The PnP manager can send a series of request to the new stack identifying it and collecting a series of properties. From this information, it can decide which drivers to layer on top of the device object that was created by the bus driver.

With this context in place, next, FIG. 5 illustrates an exemplary and non-limiting implementation of the subject matter discussed in FIG. 4. In FIG. 5, a series of device stacks with a series of PCI busses are shown in a parent (or trusted) partition 500 and a child (or a non-trusted/non-privileged) partition 502. These are merely exemplary partitions that correspond to the primary 400 and secondary 402 partitions of FIG. 4, respectively. Other partitions in various trusted and non-trusted relationships can be used. The presently disclosed device stacks can be of various types, for example: a video controller 508, an IDE controller 510, first network stack 504, a second network stack 506, a PCI bridge stack 512, and a PCI root stack 514. Those of skill in the art will readily recognize the myriad of different device stacks that can be used in a typical virtual machine environment.

In FIG. 5, device stacks are represented by rectangles and device objects by ovals. As mentioned already, the bottom-most device object in a stack can be the bus driver, which in FIG. 5 is the "PCI.sys" object, except in the case of the PCI root bus. In this example, the root bus can be discovered by looking at the ACPI firmware, which is why "ACPI.sys" is at the bottom of the PCI root stack 514. The other device objects, for example, "Net.sys" in the Network 1 504 stack or "Video" in the Video stack 508 are on top of the PCI.sys object and they can control the actual physical devices.

In this example, the parent partition 500 can control all the devices within the machine. Even when it assigns a device to another partition, such as the child partition 502, it can retain some measure of control over the devices, so that the child partition cannot prevent operations which involve the entire bus or the entire machine. As was discussed already, one way for the parent partition 500 to retain such control is by using filters above and below child partition drivers, and using and manipulating various sets of instructions associated therewith.

For example, if the parent partition 500 wants to allow a child partition 502 to directly control a device, perhaps a network interface, it can first unload any driver which is currently controlling that device in the parent partition 500 (so as to avoid any conflict with a driver in the child partition). It can then load a different driver in the parent partition 500, one which exists to manage requests that are passed along to the child partition. In FIG. 5, this function is fulfilled by the "VMRedir.sys" object in the Network 2 stack 506. Thus, as was suggested above, the "VMRedir.sys" object in the parent partition 500 is a proxy object for the "Net.sys" object in Network 2 stack 516 of the child partition 502.

In the child partition 502, a driver can build a device stack that corresponds to a physical device (e.g., a network interface card (NIC)). This can be done by any virtual machine-aware set of device drivers, but in FIG. 5 it is shown as done by the "VMBus.sys" object, which can be a mechanism for managing cross-partition I/O (see Ser. No. 11/128,647, "Partition Bus,"). On top of this bus driver object, a device object is layered ("VMPCI.sys") that manages PCI Express devices that have been assigned to the child partition On top of this, the regular driver (FDO) for this PCI Express NIC is loaded ("Net.sys"). And, on top of this, another device object is layered (again, "VMPCI.sys") so that it can intercept some IRPs sent to this stack from within the secondary partition and/or redirect instructions from the parent partition 500. Both the first filter 408 and the second filter 410 of FIG. 4 can correspond to the "VMPCI.sys" object of FIG. 5.

Figure 6:
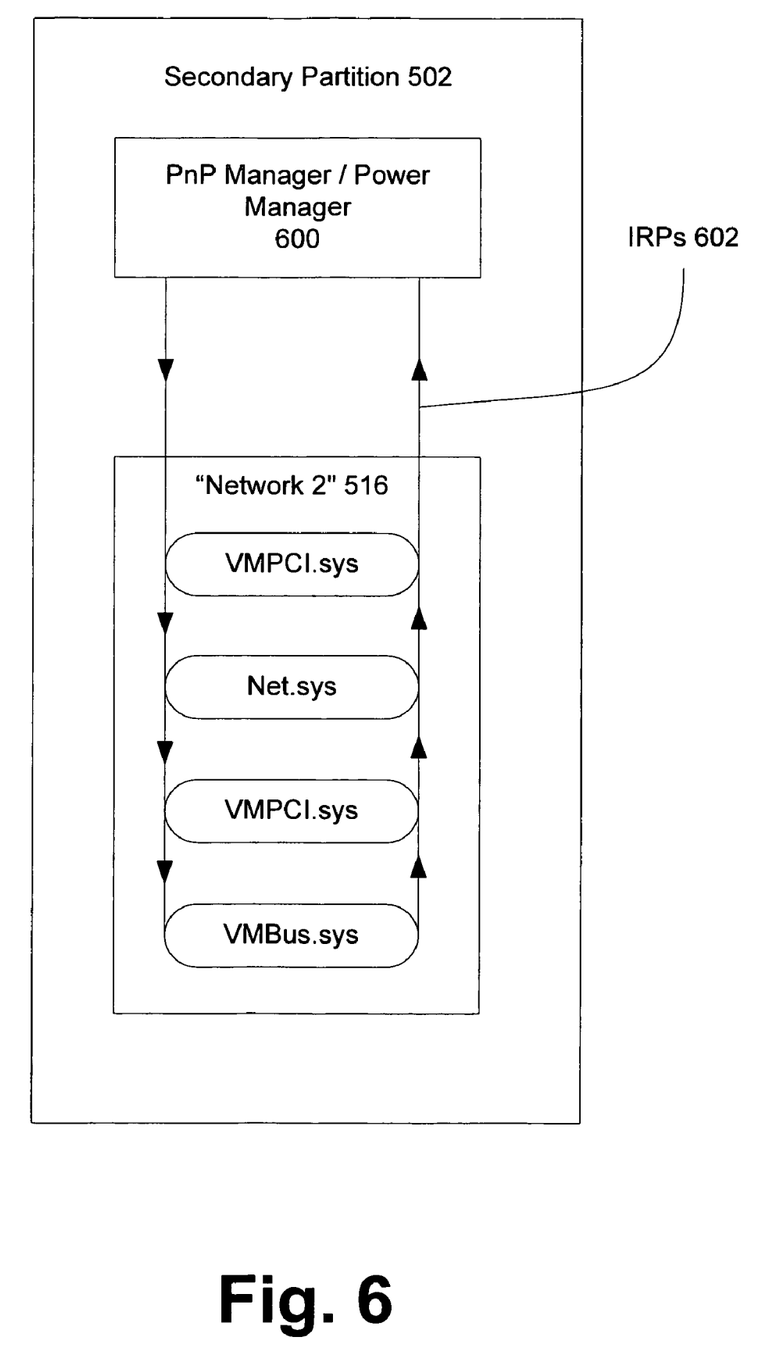
FIG. 6 illustrates in detail how input/output request packets (IRPs) flow through a device driver stack (one component of the system of FIG. 4)

Next, FIG. 6 illustrates in more detail how IRPs 602 flow through a device driver stack 516 shown in FIG. 5. The arrowed IRP 602 lines represent flow to and from the PnP Manager and/or the Power Manager 600 (which may or may not be separate entities). The top device object (part of "VMPCI.sys") intercepts these IRPs and handles them in a way that causes the secondary partition 502 to believe that the device stack 516 has heeded any policy that comes from within the secondary partition. The arrowed lines also show IRP 602 flow that can be observed by the FDO, namely, "Net.sys.", and they show IRPs which flow down to the bus driver ("VMBus.sys").

Figure 7:
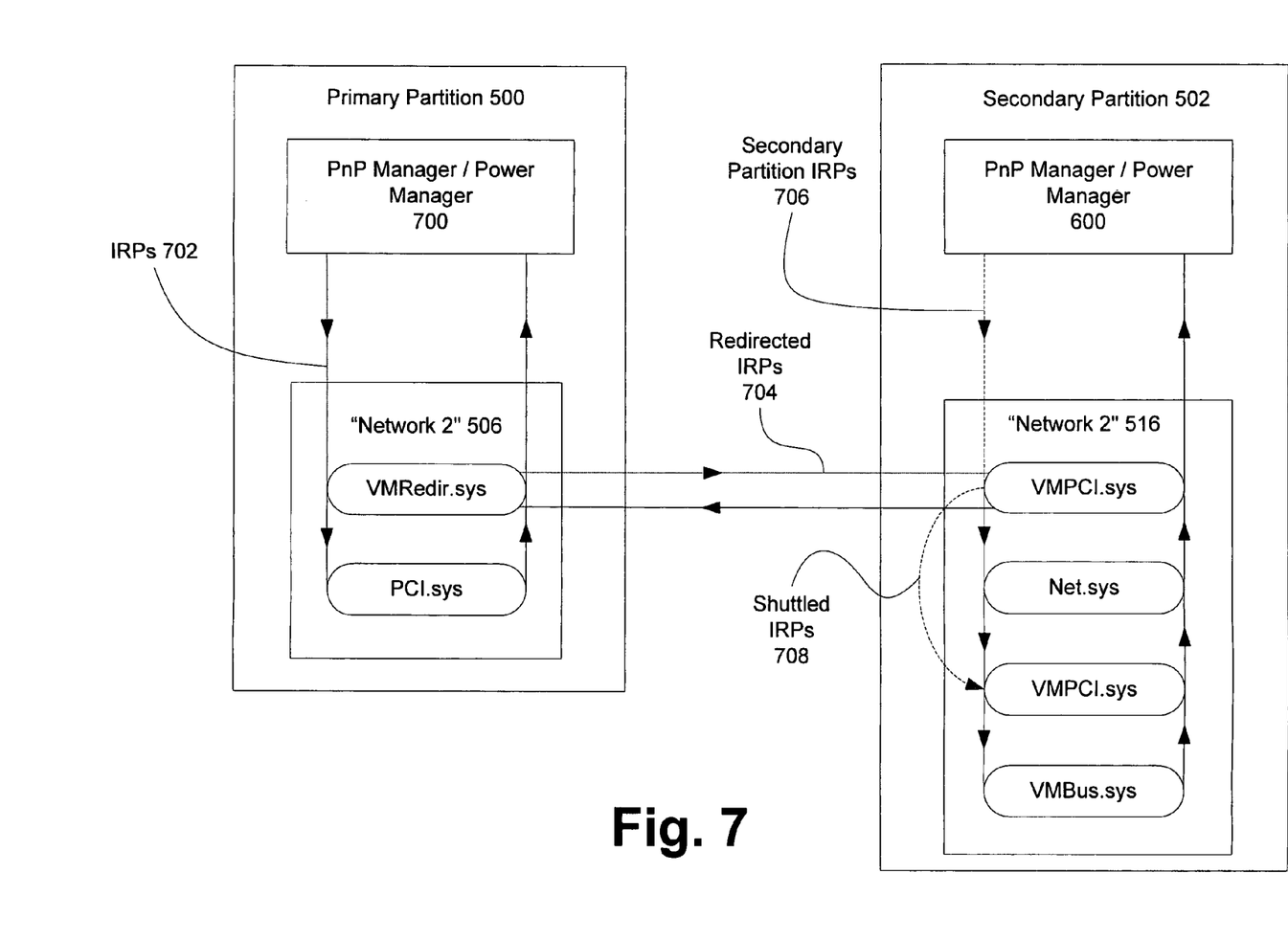
FIG. 7 illustrates how state changing plug-and-play and power management operations can be handled.

FIG. 7 shows how state changing PnP and Power Management 700 IRPs 702 (shown in dotted lines) can be sent in the primary partition 500, and how these IRPs 704 (again, shown in dotted lines) are forwarded to the secondary partition 502. These IRPs 704 are in essence redirected form the "PCI.sys" object in the primary partition 500 network stack 506 to the "VMPCI.sys" object in the secondary partition 502 network stack 516. There, the "VMPCI.sys" object (i.e. filter) can pass them down to the device driver "Net.sys" or use them as rules or guidelines for intercepting any second partition 502 IRPs 706.

In one aspect of the presently disclosed subject matter, IRPs 702 that are sent in the primary partition 500 can cause messages to be sent to the secondary partition 502. Those messages can be turned back into IRPs by VMPCI.sys and sent to a NIC driver (viz. "Net.sys"). The NIC driver can forward them down (as it's supposed to) to the "VMPCI.sys" object, and this object can catch them there and stop them from going further down the stack. Meanwhile, any state changing IRPs 706 that might originate within the secondary partition 502 (shown, at least in part, in dashed lines) can either be sent down the stack to the NIC driver (viz. "Net.sys") or they can be shuttled 708 past it, since the layers above and below "Net.sys" are the "VMPCI.sys." objects.

Furthermore, any attempts to manage devices at the bus level that originate with "Net.sys" can be sent down the stack to "VMPCI.sys", and they can be sent back to the primary partition 500 and onward to the "PCI.sys." object. Examples of bus level management could include a request to read the network device's PCI Express configuration space. Those of skill in the art, reading the present disclosure, will appreciate the various other permutations that the above discussed aspects could take. None of these aspects are meant to be limiting, but merely exemplary.

SUMMARY

Figure 8:
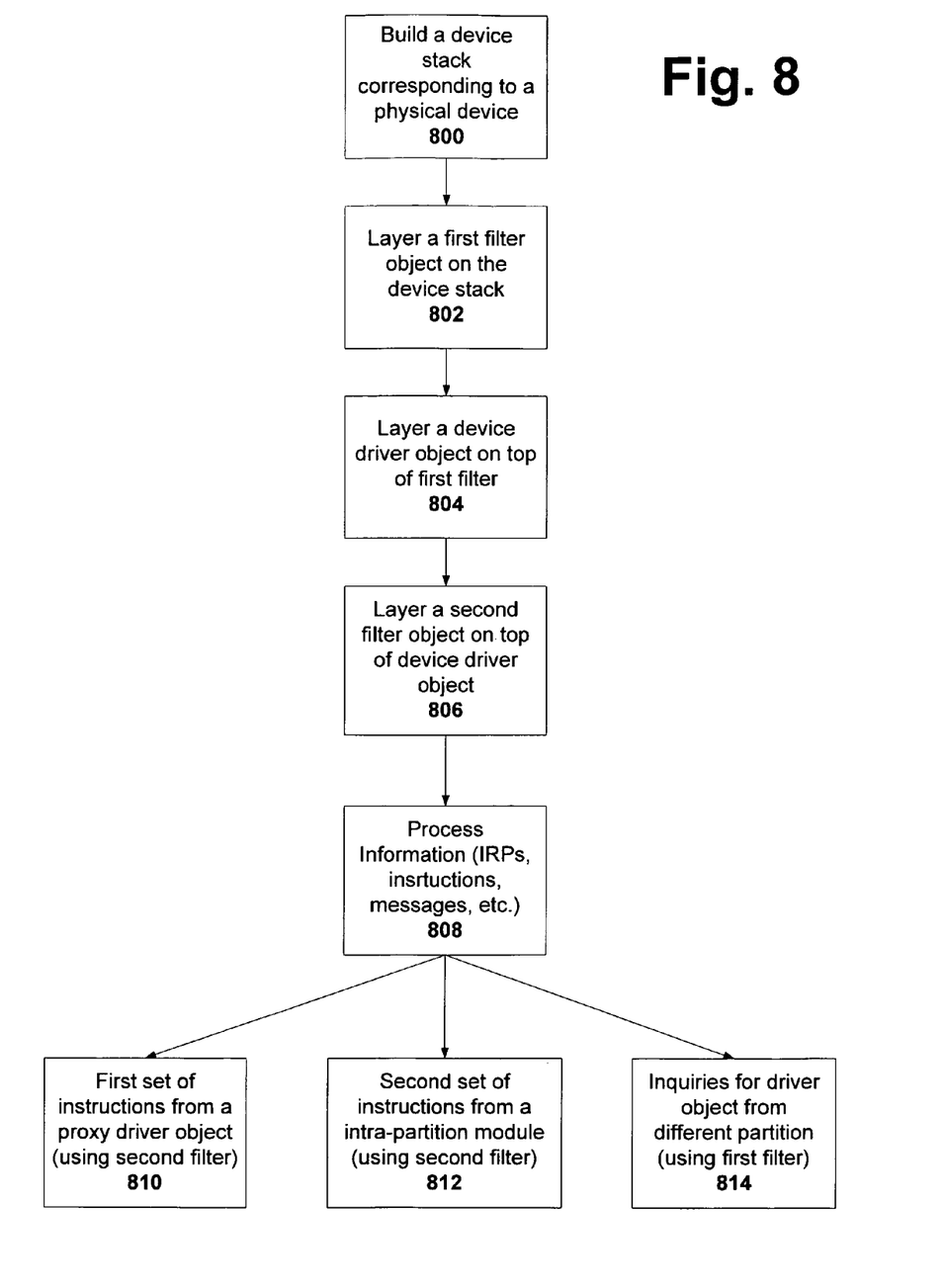
FIG. 8 illustrates, in summary form, one exemplary and non-limiting method for producing a mechanism for managing operations in a virtual machine environment.

In summary, various systems for managing operations in a virtual machine environment were discussed. These systems, as is apparent to those of skill in the art, can be implemented as methods or instructions subsisting on computer readable media. For instance, one exemplary and non-limiting method could comprise of the following steps (where the order of these steps can be implemented in various permutations). At box 800, in a partition, a device stack can be build corresponding to a physical device. Then, at box 802, a first filter object can be layered on the device stack, where this filter presents an interface to a device driver object for the object to engage in bus-related operations. Next, at box 804, the device driver object can be layered on top of the first filter object, where the driver object can control the physical device via the first filter object. Finally, at box 806, a second filter object can be layered on top of the device driver object, where the second filter object can be configured to direct a first set of instructions from a proxy driver object to the device stack, where the proxy driver can reside in a different partition from this partition.

Now that the device stack with a first filter object, a device driver object, and a second filter object is built, this device stack can interact with a proxy driver object in the other partition. Thus, at box 808, the device stack can process instructions, IRPs, messages, and the like (essentially any information, whether code and/or data). For example, at box 810, it can process the aforementioned first set of instruction from the proxy driver object (where such instructions may have system-wide or only local effects). Moreover, at box 812, it can process a second set of instructions intended for the device driver object, where the second instructions originate from the partition (i.e. they are intra-partition instructions from the same partition as the stack—as opposed to being inter-partition, hence originating from a different partition), and where these second instructions may related to plug-and-play and power events. Lastly, at box 814, the first filter can provide an interface to the driver object and can obtain the necessary information from a different partition for the driver object (e.g. bus-related information).

Another aspect of what has been described so far can include a dual concept of control. For example, the concept of control can be separated as control of the device state that relates to the operation of the device itself and as control of the device state that affects the entire system. For instance, the former case could include information associated with individual I/O operations (e.g. the offset on a disk that is currently being read). And, moreover, the latter case could include the power switch for the device, where it can't be turned on unless the entire system is also powered on. Thus, in this aspect, what occurs is a separation of the device state that relates to I/O and assigning it to a secondary partition while keeping control of the device state which relates to the entire system within the primary partition.

The methods, systems, apparatuses of the presently disclosed subject matter may also be embodied in the form of program code (such as computer readable instructions) that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, such as that shown in the figure below, a video recorder or the like, the machine becomes an apparatus for practicing the present subject matter. When implemented on a general-purpose processor, the program code combines with the processor to provide a unique apparatus that operates to perform the saving and restoring functionality of the present subject matter.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, managing operations in a virtual machine environment were discussed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for managing operations in a virtual machine environment, comprising:
   a processor;
   at least one proxy driver object located in a first partition, wherein said at least one proxy driver object is a proxy driver for a device;
   at least one device driver object located in a driver stack in a second partition, wherein said at least one driver object is configured to control said device;
   at least one first filter object located beneath said at least one device driver object in said driver stack, wherein said at least one first filter object presents an interface to said at least one device driver object for the at least one device driver object to engage in bus-related functions including controlling said device; and
   at least one second filter object located above said at least one device driver object in said driver stack, wherein said at least one second filter object is configured to at least one of (a) direct first instructions from said at least one proxy driver object to said at least one device driver object, and (b) intercept second instructions intended for said at least one device driver object, wherein said second instructions originate from said second partition.

2. The system according to claim 1, further comprising:
   a first partition object communicating with said at least one proxy device object, wherein said first partition object directs said at least one proxy device object to implement at least one state-changing event, wherein said at least one state-changing event is conveyed via said first instructions.

3. The system according to claim 2, wherein said first partition object is at least one of (a) a plug-and-play manager object and (b) a power manager object.

4. The system according to claim 2, wherein said at least one state-changing event is a system-wide event.

5. The system according to claim 1, further comprising:
   a second partition object communicating with said at least one second filter object via said second instructions, wherein said second partition object directs said at least one second filter object to implement instructions related to at least one of (a) a plug-and-play event, and (b) a power event.

6. The system according to claim 1, wherein, upon intercepting said second instructions, said at least one second filter object compares said second instructions against at least one policy set by one of (a) said first partition, and (b) a virtualizing module, wherein, in response to determining that said second instructions conflict with said at least one policy, said at least one second filter object replaces said second instructions with instructions consistent with said at least one policy and passes them down to said at least one device driver object.

7. The system according to claim 1, wherein, in response to determining that said at least one device driver object refuses to conform to at least one policy set by said first partition, control of said device by said at least one device driver object is revoked.

8. A method for managing operations in a virtual machine environment, comprising:
   building in a partition a device stack corresponding to a physical device;
   layering on said device stack a first filter object that presents an interface to a device driver object;
   layering said device driver object on top of said first filter object, wherein said driver object controls said physical device via said first filter object;
   layering a second filter object on top of said device driver object; and
   directing, by said second filter object, a first set of instructions from a proxy driver object to said device stack, wherein said proxy driver object resides in a different partition from said partition, wherein said proxy driver object is a proxy driver for the physical device.

9. The method according to claim 8, further comprising:

intercepting a second set of instructions intended for said device driver object, wherein said second instructions originate from said partition.

10. The method according to claim 9, further comprising:

following said intercepting, in response to determining that said second instructions conflict with policies set by a module in said different partition, substituting alternative instructions.

11. The method according to claim 8, further comprising:

removing a driver object for said physical device from said different partition.

12. The method according to claim 8, further comprising:

loading said proxy driver that manages requests from said different partition, wherein said requests are passed by said proxy driver to said partition to perform tasks by said device driver object.

13. The method according to claim 8, further comprising:

redirecting requests for said proxy driver object to said driver stack, wherein said requests have system-wide effects.

14. The method according to claim 8, further comprising:

in response to detecting refusal by the device driver object to participate according to policies set by said different partition, revoking control of said physical device from said device driver object.

15. The method according to claim 8, further comprising:

designating said partition as a non-privileged partition and said different partition as a trusted partition of said virtual machine environment.

16. A non-transitory computer readable medium bearing computer executable instruction implemented on a physical computing device, comprising:

instantiating proxy driver objects in a first partition, wherein said proxy driver objects act as proxies for devices;

instantiating device driver objects in driver stacks in a second partition, wherein said driver objects are configured to control said devices;

instantiating first filter objects beneath said device driver objects in said driver stacks, wherein said first filter objects present interfaces to said device driver objects for said device driver objects to control said devices;

instantiating second filter objects above said device driver objects in said driver stacks; and, wherein said second filter objects are configured to at least one of (a) direct first partition based instructions to said device driver objects and (b) intercept second partition based instructions intended for said device driver objects and directing, by a second filter object of said second filter objects, a first set of instructions from a proxy driver object of said proxy driver objects to a device stack of said device stacks, wherein said proxy driver object of said proxy driver objects is a proxy driver object for the physical device.

17. The non-transitory computer readable medium according to claim 16, further comprising:

unloading any driver objects for said devices from said first partition.

18. The non-transitory computer readable medium according to claim 16, further comprising:

directing said first partition based instructions to said device driver objects following requests by managing modules for said proxy device objects, wherein said managing modules form a set of modules including plug-and-play managers and power managers.

19. The non-transitory computer readable medium according to claim 16, further comprising:

designating said first partition as a trusted partition and said second partition as a non-trusted partition.

20. The non-transitory computer readable medium according to claim 16, further comprising:

intercepting said second partition based instructions intended for said device driver objects and examining said second partition based instructions for conformity to first partition based policies; and upon said intercepting, substituting said second partition based instructions with conforming instructions to said policies in response to determining that a non-conforming occurs between said second partition based instructions and said first partition based policies.

* * * * *